US012688180B2

(12) United States Patent
Liu et al.

(10) Patent No.:  US 12,688,180 B2
(45) Date of Patent:      Jul. 21, 2026

(54) DATA-CHANGE-DRIVING EXECUTION SYSTEM AND EXECUTION METHOD

(71) Applicants: DIGIWIN CO., LTD., Shanghai (CN); DATA SYSTEMS CO., LTD., New Taipei City (TW)

(72) Inventors: Nansheng Liu, Shanghai (CN); Guoxin Sun, Shanghai (CN)

(73) Assignees: DIGIWIN CO., LTD., Shanghai (CN); DATA SYSTEMS CO., LTD., New Taipei City (TW)

( * ) Notice: Subject to any disclaimer, the term of this patent is extended or adjusted under 35 U.S.C. 154(b) by 353 days.

(21) Appl. No.: 18/301,242

(22) Filed: Apr. 16, 2023

(65) Prior Publication Data

US 2024/0273082 A1      Aug. 15, 2024

(30) Foreign Application Priority Data

Feb. 9, 2023    (CN) .......................... 202310101270.0

(51) Int. Cl.
*G06F 16/00*          (2019.01)
*G06F 16/23*          (2019.01)
*G06F 16/25*          (2019.01)
*H04L 67/55*          (2022.01)

(52) U.S. Cl.
CPC ........ *G06F 16/2358* (2019.01); *G06F 16/258* (2019.01); *H04L 67/55* (2022.05)

(58) Field of Classification Search
CPC ... G06F 16/2358; G06F 16/258; H04L 67/05; H04L 67/55

USPC .......................................................... 707/609
See application file for complete search history.

(56)                References Cited

U.S. PATENT DOCUMENTS 11,100,129  B1*   8/2021  Popick ................ G06F 16/2365
                                                                707/707
12,299,061  B1*   5/2025  Sharma ............. G06F 16/24552
                                                                707/707
2004/0002972  A1*  1/2004  Pather ..................... G06F 9/542
2016/0140295  A1*  5/2016  Powell .................. G06F 16/288
                                                                705/3
2019/0171650  A1*  6/2019  Botev ................. G06F 16/2358
                                                                707/707
2020/0019543  A1*  1/2020  Wang .................. G06F 16/2379
                                                                707/707
2023/0015950  A1*  1/2023  Qian ........................ G06F 9/48
                                                                707/707

* cited by examiner

*Primary Examiner* — Alexandria Y Bromell
(74) *Attorney, Agent, or Firm* — JCIPRNET

(57)                ABSTRACT
A data-change-driving execution system and a data-change-driving execution method are provided. The data-change-driving execution system of the disclosure includes a storage device and a processor. The processor is configured to capture changing data in a target database, the processor obtains event information corresponding to the changing data according to the data matching rule, and the processor outputs the event information, so that a message server executes a corresponding process according to the event information. In this way, the data-change-driving execution system and the data-change-driving execution method use fewer system resources to timely perceive a target system, and drive the corresponding process according to the changing data.

4 Claims, 4 Drawing Sheets

100

S210

Capture changing data in a target database

S220

Obtain event information corresponding to the changing data according to the data matching rule

S230

Output the event information

DATA-CHANGE-DRIVING EXECUTION SYSTEM AND EXECUTION METHOD

CROSS-REFERENCE TO RELATED APPLICATION

This application claims the priority benefit of China application serial no. 202310101270.0, filed on Feb. 9, 2023. The entirety of the above-mentioned patent application is hereby incorporated by reference herein and made a part of this specification.

BACKGROUND

Technical Field

The disclosure relates to a data processing technology, and particularly relates to a data-change-driving execution system and a data-change-driving execution method.

Description of Related Art

Generally, users need to perceive changing data of a database according to actual needs. In order to simplify a process of manual inspection, when the database adds or modifies business data, the system needs to automatically generate changing business data and store the changing business data in a storage medium. In this regard, an existing practice is to poll the database or an application programming interface (API) according to a time stamp through the API. Namely, the application programming interface polls the API at a setting time interval to obtain the changing data. However, the method of regularly polling the database needs to consume a large amount of resources and has a problem of a larger delay (time difference), and it is impossible to know a data status before and after the change, and the way of obtaining data is invasive to a target database.

SUMMARY

The disclosure is directed to a data-change-driving execution system and a data-change-driving execution method, which are adapted to automatically drive corresponding processes according to the data change.

According to an embodiment of the disclosure, the data-change-driving execution system of the disclosure includes a storage device and a processor. The storage device is used for storing a data matching rule. The processor is coupled to the storage device. The processor captures changing data in a target database, the processor obtains event information corresponding to the changing data according to the data matching rule, and the processor outputs the event information.

According to an embodiment of the disclosure, the data-change-driving execution method of the disclosure includes: capturing changing data in a target database by a processor; reading a data matching rule stored in a storage device by the processor; obtaining event information corresponding to the changing data by the processor according to the data matching rule; and outputting the event information by the processor.

Based on the above description, the data-change-driving execution system and data-change-driving execution method of the disclosure are adapted to perceive changing data in real time and capture an item, a type, and content in the changing data, so as to effectively and automatically output the event information according to the changing data.

To make the aforementioned more comprehensible, several embodiments accompanied with drawings are described in detail as follows.

DESCRIPTION OF THE EMBODIMENTS

Figure 1:
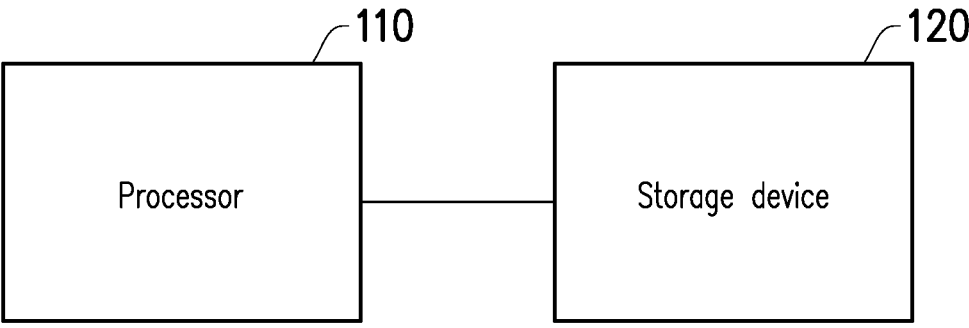
FIG. 1 is a schematic diagram of a data-change-driving execution system according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
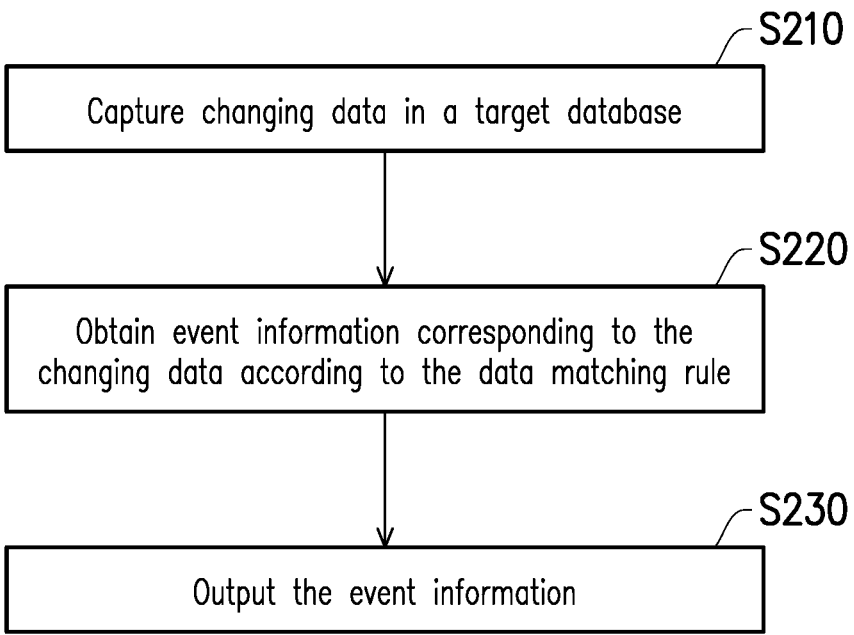
FIG. 2 is a flowchart of a data-change-driving execution method according to an embodiment of the disclosure.

FIG. 1 is a schematic diagram of a data-change-driving execution system according to an embodiment of the disclosure. FIG. 2 is a flowchart of a data-change-driving execution method according to an embodiment of the disclosure. Referring to FIG. 1 and FIG. 2, a data-change-driving execution system 100 includes a processor 110 and a storage device 120. The processor 110 is coupled to the storage device 120. The data-change-driving execution system 100 may also include a communication interface or a data transmission interface with actual circuit elements, so that the processor 110 may communicate or perform data transmission with an external business process system or message server. In the embodiment, the data-change-driving execution system 100 may be implemented, for example, on a cloud server or a private server within an enterprise. The data-change-driving execution system 100 may also be integrated in an enterprise resource planning (ERP) system, and may execute multiple application programming interfaces (API) to call multiple business program modules. In another embodiment, the data-change-driving execution system 100 of the disclosure may be built based on a microservice architecture, and may be deployed on a cloud server in a form of Software as a Service (SaaS), to provide changing data detection services.

Referring to FIG. 1 and FIG. 2, the data-change-driving execution system 100 executes following steps S210-S230. The storage device 120 stores a data matching rule. In step S210, the processor 110 captures the changing data in a target database. To be specific, the data-change-driving execution system 100 may be connected to the target database through communication, so that the processor 110 may read and monitor physical data changes (i.e., changing data) in the target database. In step S220, the processor 110 obtains event information corresponding to the changing data according to the data matching rule. To be specific, the processor 110 obtains the corresponding event information from the data matching rule according to the content of the changing data. For example, the data matching rule includes that when a status of a material A in procurement data is changed from unpurchased to purchased, the corresponding event information is to update inventory data of the material A. In this way, the processor 110 captures the changing data about the material A from the target database, and then the processor 110 obtains the corresponding event information (for example, updating the data of the material A) according to the data matching rule.

In step S230, the processor 110 outputs the event information. For example, the processor 110 may output the event information to the message server, so that the message server executes a corresponding process. In this way, the data-change-driving execution system 100 may perceive physical data changes of the target database in real time, and convert the changing data into the corresponding event information according to a default rule. The data-change-driving execution system 100 outputs the event information to a corresponding server, so as to drive a process (such as a business process) timely. In this way, the data-change-driving execution system 100 may timely perceive the changing content in the target database in a low latency and non-intrusive manner, and output the corresponding event information according to the changing content.

In the embodiment, the processor 110 of the data-change-driving execution system 100 may include, for example, a central processing unit (CPU), or other programmable general-purpose or special-purpose microprocessor, digital signal processor (DSP), application specific integrated circuits (ASIC), programmable logic device (PLD), other similar processing circuits or a combination of these devices.

The storage device 120 may also implement a remote cloud storage service or a local data storage service. The storage device 120 may include a memory and/or a database, where the memory may be, for example, a non-volatile memory (NVM). The storage device 120 may store related programs, modules, systems or algorithms for implementing various embodiments of the disclosure, so as to be accessed and executed by the processor 110 to realize the relevant functions and operations described in the various embodiments of the disclosure. The storage device 120 may cache the changing data, data changing time, data records, the data matching rule and setting information of a format rule described in various embodiments of the disclosure. In addition, the changing data described in each embodiment of the disclosure may be changing data generated by the change or update of the target database, and the changing data may record related changing fields, such as a changing item, changing time information, a changing type, data before and after change, and other data-related records, etc.

Figure 3:
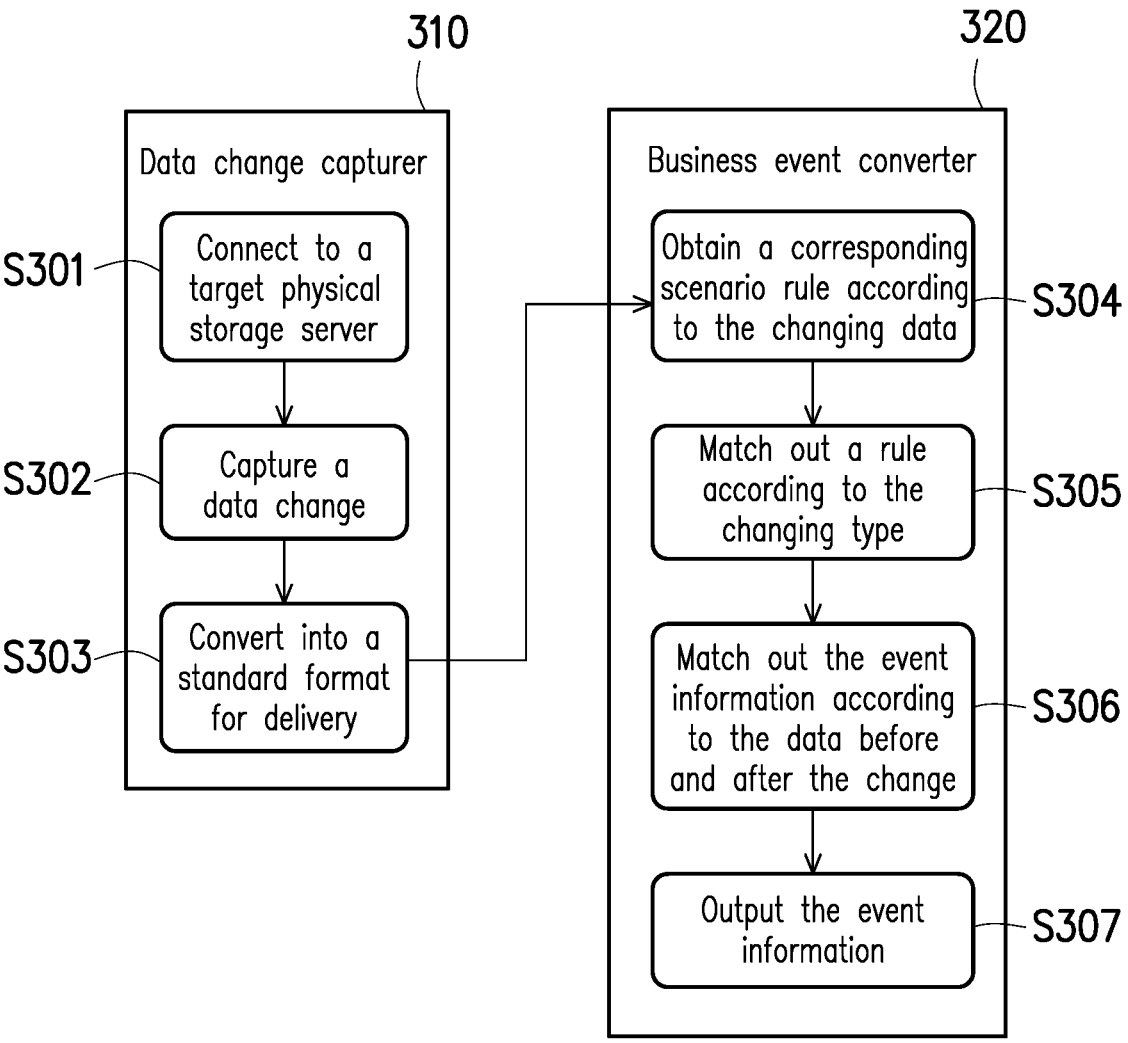
FIG. 3 is a schematic diagram of a data change capturer and a business event converter according to an embodiment of the disclosure.

FIG. 3 is a schematic diagram of a data change capturer and a business event converter according to an embodiment of the disclosure. In the embodiment, the data-change-driving execution system 100 includes a data change capturing module and an event converter. In an embodiment, the storage device 120 stores the data change capturing module and the event converter. The data change capturing module and the event converter may be implemented by a programming language such as JavaScript object notation (JSON), extensible markup language (XML) or YAML, etc., but the disclosure is not limited thereto. In another embodiment, the data change capturing module may be a trigger.

To be specific, the processor 110 executes the data change capturing module, and the storage device 120 stores settings related to the data change capturing module (such as settings of a data capturing/extracting rule and a capturing range). Also, the data change capturing module may be at least one trigger. For example, the data change capturing module may be composed of an adding trigger, a modifying trigger and a deleting trigger, or may be composed of a single trigger. In this way, the data change capturing module may analyze a log in the target database to capture the changing data. In an embodiment, the target database stores the log, and the log may be a binlog, so that the data change capturing module analyzes the log of the target database to obtain data change information (i.e., the changing data).

In an embodiment, the data change capturing module may be a data change capturer 310. Referring to FIG. 1 and FIG. 3, the data-change-driving execution system 100 executes the following steps S301-S307. In step S301, the data change capturer 310 connects to a target physical storage server (i.e., the target database). In an embodiment, the data change capturer 310 is disposed on the same server as the target physical storage server (i.e., the target database). In another embodiment, the data change capturer 310 is communicatively connected to the target physical storage server. In this way, the data change capturer 310 captures the changing data in the target database through an access operation.

In step S302, the data change capturer 310 captures a data change (i.e., changing data). For example, the data change capturer 310 may take changing business data in the target database as the changing data. In an embodiment, the data change capturer 310 may capture the log in the target database through a transaction data capturing technology and analyze the changing data from the log. The transaction data capturing technology may be, for example, Debezium. In another embodiment, the data change capturer 310 may be a trigger. In this way, whenever the data in the target database changes, the trigger writes the changing data into a temporary table, so as to efficiently sense the changing data.

In step S303, the data change capturer 310 converts the changing data into a standard format for delivery. The storage device 120 stores a format rule. The format rule may be, for example, a setting rule such as an order and format of data fields. Specifically, the data change capturer 310 converts the changing data into a default format according to the format rule, and the data change capturer 310 outputs the changing data after format conversion to the business event converter 320.

In step S304, the business event converter 320 (i.e., the event converter) obtains a corresponding scenario rule according to an entity (i.e., a changing item) in the changing data. Specifically, the changing data includes the changing item and a changing type. The changing item may be, for example, an item such as a purchase requisition, a purchase order, employee information, inventory data, and item information. The changing type may be a changing type of the changing data, such as adding, modifying, and deleting. The data matching rule includes multiple scenario rules, each scenario rule includes multiple rules, and each rule includes multiple event information. In this way, the business event converter 320 matches the corresponding scenario rule from the data matching rule according to the changing item (i.e., the entity) in the changing data.

In step S305, the business event converter 320 matches out a rule according to the changing type of the changing data (such as adding, modifying, and deleting). Namely, the business event converter 320 finds the rule corresponding to the changing type from the scenario rule obtained in step S304 according to the changing type of the changing data. In step S306, the business event converter 320 matches out the corresponding event information from the rule obtained in step S305 according to the data before and after the change in the changing data. The data before and after the change are the changing content. Namely, the business event converter 320 obtains the corresponding scenario rule from the data matching rule according to the changing item.

Moreover, the business event converter 320 obtains the corresponding rule from the scenario rule according to the changing type, and then the business event converter 320 matches the corresponding event information from the rule according to the changing content of the changing data.

In step S307, the business event converter 320 outputs the event information. Therefore, the data-change-driving execution system 100 in the embodiment may automatically capture the changing data in the target database, and the data-change-driving execution system 100 may automatically match the corresponding event information from the rule preset by the user according to the item, type and content in the changing data.

Figure 4:
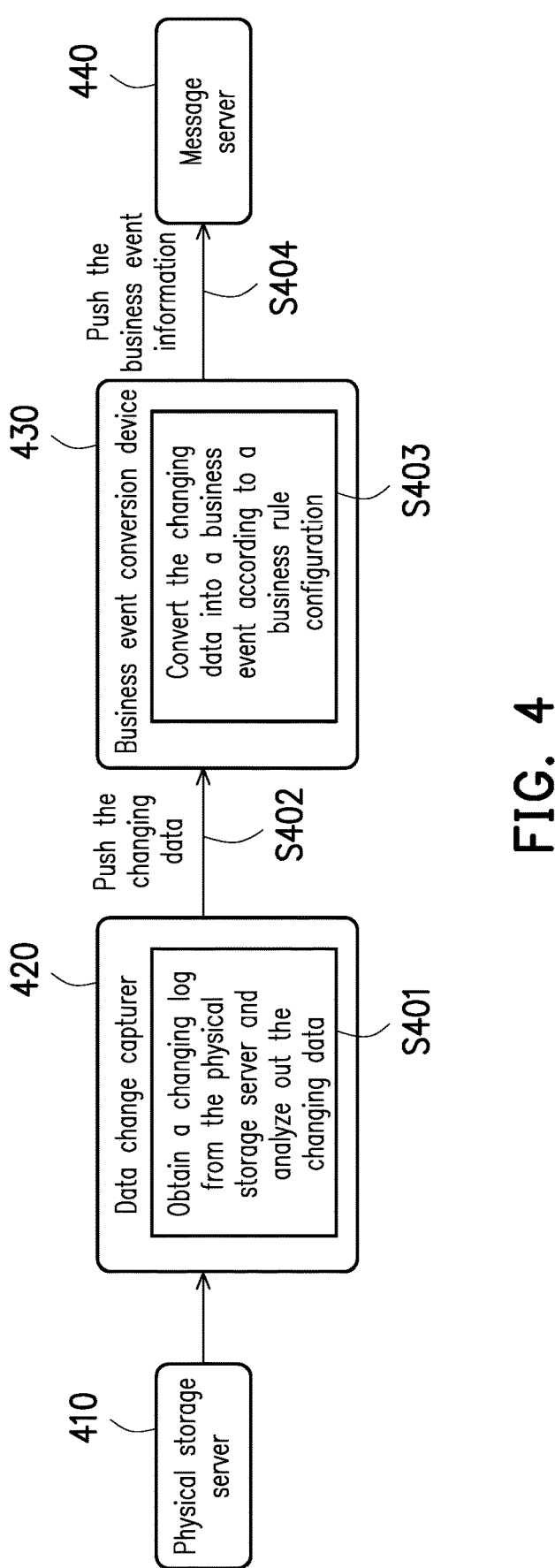
FIG. 4 is a schematic diagram of a physical storage server and a data-change-driving execution system according to an embodiment of the disclosure.

FIG. 4 is a schematic diagram of a physical storage server and a data-change-driving execution system according to an embodiment of the disclosure. Referring to FIG. 1 and FIG. 4, the data-change-driving execution system 100 may further include a message server 440, and the message server 440 may be a server with a communication function, and is coupled to the processor 110. The message server 440 is configured to receive the event information, and the message server 440 executes a process corresponding to the event information according to the event information. The process includes at least one of submitting information, outputting notification information, modifying data, updating data and recording information.

To be specific, the data-change-driving execution system 100 may also include a communication interface or a data transmission interface with actual circuit components, so that the processor 110 may communicate with or perform data transmission with the message server 440. Referring to FIG. 1 and FIG. 4, the data-change-driving execution system 100 may execute the following steps S401-S404. In step S401, the data change capturer 420 obtains a changing log from the physical storage server 410 (i.e., the target database) and analyzes out the changing data. For example, the changing data includes a changing item (such as "purchase requisition"), a changing data type (such as "modification"), and a changing content (such as "an approval status before the change is unapproved, and the approval status after the change is approved").

In step S402, the data change capturer 420 pushes the changing data to a business event conversion device 430. In an embodiment, the business event conversion device 430 and the data change capturer 420 may be set up on a same server. In another embodiment, the business event conversion device 430 may also be set up on a different server from the data change capturer 420. In step S403, the business event conversion device 430 converts the changing data into a business event according to a business rule configuration.

For example, the business event conversion device 430 finds out the corresponding scenario rule (for example, "purchase requisition approval complete") from the data matching rule according to the changing item ("purchase requisition") in the changing data. Then, the business event conversion device 430 matches out the corresponding rule from the scenario rule ("purchase requisition approval complete") according to the changing data type (such as "modification"), and matches out the corresponding event information ("submitting the purchase order to deliver a corresponding purchase task") according to the changing content ("the approval status before the change is unapproved, and the approval status after the change is approved") in the changing data. In step S403, if matching of the changing data and the data matching rule fails, the perception operation (i.e., perceiving the changing data) ends.

In step S404, the business event conversion device 430 pushes the business event information to the message server 440. In this way, after the message server 440 receives the event information ("submitting the purchase order to deliver the corresponding purchase task"), it executes the process of submitting the purchase order corresponding to the event information and executes the purchase task.

In summary, the data-change-driving execution system 100 and the data-change-driving execution method of the disclosure may communicatively connect the data change capturing module to the target database, so as to accurately capture the changing data (such as business data) in the target database in real time. Moreover, the event converter matches out the event information corresponding to the changing data from the data matching rule, and then outputs the event information to the message server 440, so as to effectively deliver the information corresponding to the change of the target database to the user in real time. Moreover, the message server 440 may automatically execute or initiate a corresponding process according to the event information. In this way, the data-change-driving execution system 100 and the data-change-driving execution method may timely perceive a target system (such as the target database) by using less system resources, and obtain the changing data from the target system in a low latency and non-intrusive manner, and drive the corresponding process in the server according to the changing data.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A data-change-driving execution system, comprising:
   a storage device, configured to store a data matching rule; and
   a processor, coupled to the storage device,
   wherein the processor captures modified data in a target database, and the processor obtains event information corresponding to the modified data according to the data matching rule, wherein the modified data is a difference between a data before and after each of modifications in the target database,
   wherein the processor outputs the event information;
   wherein the storage device stores an event converter, and the processor executes the event converter,
   wherein the modified data comprises a modified entity and a modified type, and the event converter obtains corresponding event information from the data matching rule according to the modified entity and the modified type;
   wherein the event converter obtains a corresponding scenario rule from the data matching rule according to the modified entity, the event converter obtains a corresponding rule from the scenario rule according to the modified type, and the event converter matches out the corresponding event information from the corresponding rule according to modified content of the modified data;
   wherein the storage device stores a data change capturing module, the processor executes the data change capturing module,
   wherein the data change capturing module analyzes a log in the target database to capture the modified data;

wherein the data change capturing module is disposed on a same server as the target database, and the data change capturing module captures the modified data in the target database through an access operation, wherein the data change capturing module converts the modified data into a default format according to a format rule, and the data change capturing module outputs converted modified data to the event converter, wherein the data change capturing module is a trigger, and the log is a binlog.

2. The data-change-driving execution system according to claim 1, further comprising: a message server coupled to the processor, wherein the message server receives the event information, and the message server executes a process corresponding to the event information according to the event information, wherein the process comprises at least one of submitting information, outputting notification information, modifying data, updating data, and recording information.

3. A data-change-driving execution method, comprising:

capturing modified data in a target database by a processor, wherein the modified data is a difference between a data before and after each of modifications in the target database;

reading a data matching rule stored in a storage device by the processor;

obtaining event information corresponding to the modified data by the processor according to the data matching rule; and outputting the event information by the processor;

wherein the storage device stores an event converter, and the processor executes the event converter, wherein the modified data comprises a modified entity and a modified type, wherein obtaining the event information by the processor according to the data matching rule comprises:

obtaining corresponding event information from the data matching rule by the event converter according to the modified entity and the modified type;

wherein obtaining the event information by the processor according to the data matching rule further comprises:

obtaining a corresponding scenario rule from the data matching rule by the event converter according to the modified entity;

obtaining a corresponding rule from the scenario rule by the event converter according to the modified type; and matching out the corresponding event information from the rule by the event converter according to modified content of the modified data;

wherein capturing the modified data in the target database by the processor comprises:

analyzing a log in the target database by a data change capturing module to capture the modified data;

wherein the data change capturing module is disposed on a same server as the target database, and the data change capturing module captures the modified data in the target database through an access operation, wherein capturing the modified data in the target database by the processor comprises:

converting the modified data into a default format by the data change capturing module according to a format rule, and outputting converted modified data to the event converter by the data change capturing module, wherein the data change capturing module is a trigger, and the log is a binlog.

4. The data-change-driving execution method according to claim 3, further comprising:

receiving the event information through a message server, so that the message server executes a process corresponding to the event information according to the event information, wherein the process comprises at least one of submitting information, outputting notification information, modifying data, updating data, and recording information.

* * * * *